United States Patent [19]

Anderson

[11] 4,121,915
[45] Oct. 24, 1978

[54] VACUUM CLEANING APPARATUS

[76] Inventor: Andrew A. Anderson, 11700 S. Mayfield, Worth, Ill. 60482

[21] Appl. No.: 714,647

[22] Filed: Aug. 16, 1976

[51] Int. Cl.² ........................................... B01D 47/00
[52] U.S. Cl. ........................................ 55/227; 15/340;
55/244; 55/257 PV; 55/271; 55/356; 55/432
[58] Field of Search ................. 55/356, 429, 432, 433,
55/244, 227, 255, 256, 257 PV, 271; 15/340,
352, 353; 251/5, 61.1; 134/25 R

[56] References Cited

U.S. PATENT DOCUMENTS

| 1,841,556 | 1/1932 | Stelz | 15/353 |
| 2,487,226 | 11/1949 | Eastman | 251/5 |
| 2,760,595 | 8/1956 | Pynor | 55/432 |
| 2,859,461 | 11/1958 | Machovec | 15/340 |
| 2,884,963 | 5/1959 | Erndt | 251/5 |
| 3,103,300 | 9/1963 | Lau | 251/5 |
| 3,874,860 | 4/1975 | Larsson | 55/244 |

FOREIGN PATENT DOCUMENTS 738,854 10/1955 United Kingdom ............ 55/271

Primary Examiner—Bernard Nozick
Attorney, Agent, or Firm—Charles F. Pigott, Jr.

[57] ABSTRACT

An industrial vacuum cleaning apparatus adapted for cleaning gravel and dirt from building roof tops while the unit is disposed on the ground including a vacuum container, a dumping container, a valve disposed between the latter two containers which opens intermittently in a timed sequence, a water filter unit for filtering contaminated air before exhausting it to the atmosphere and a programmed air control system for sequentially actuating various portions of the apparatus.

9 Claims, 8 Drawing Figures

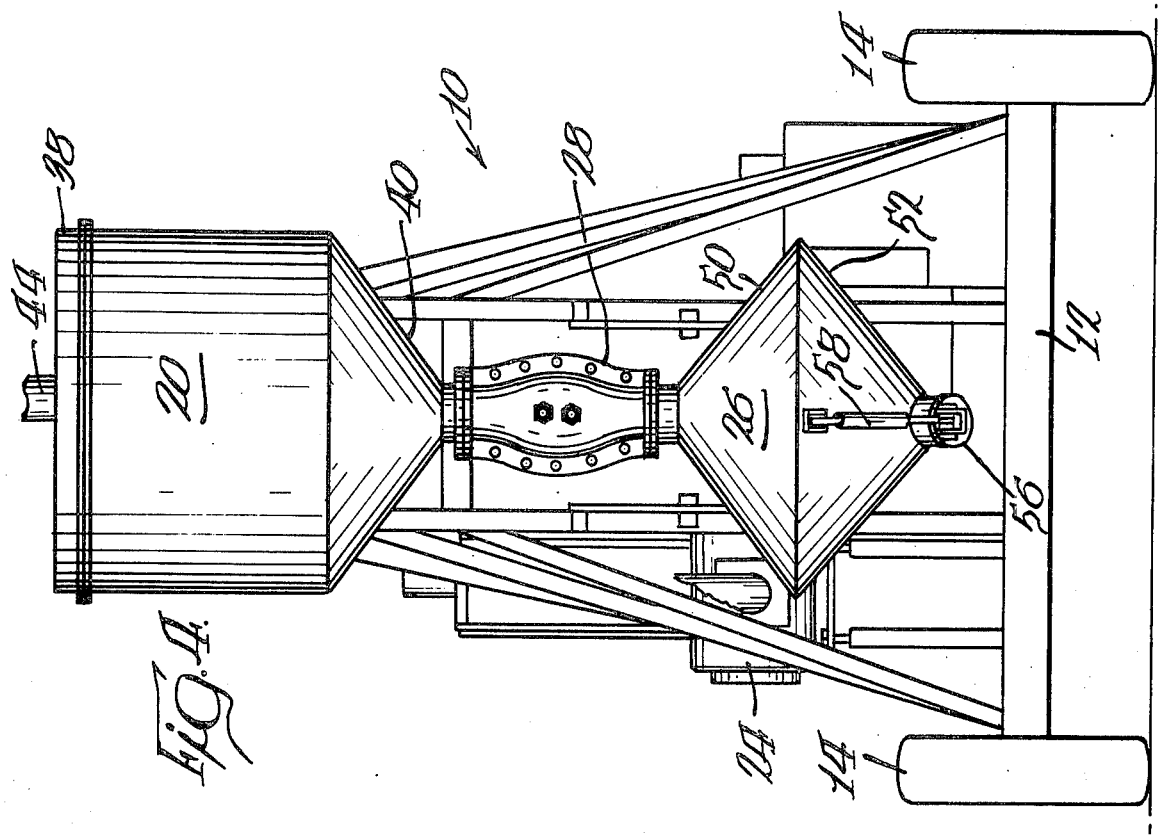
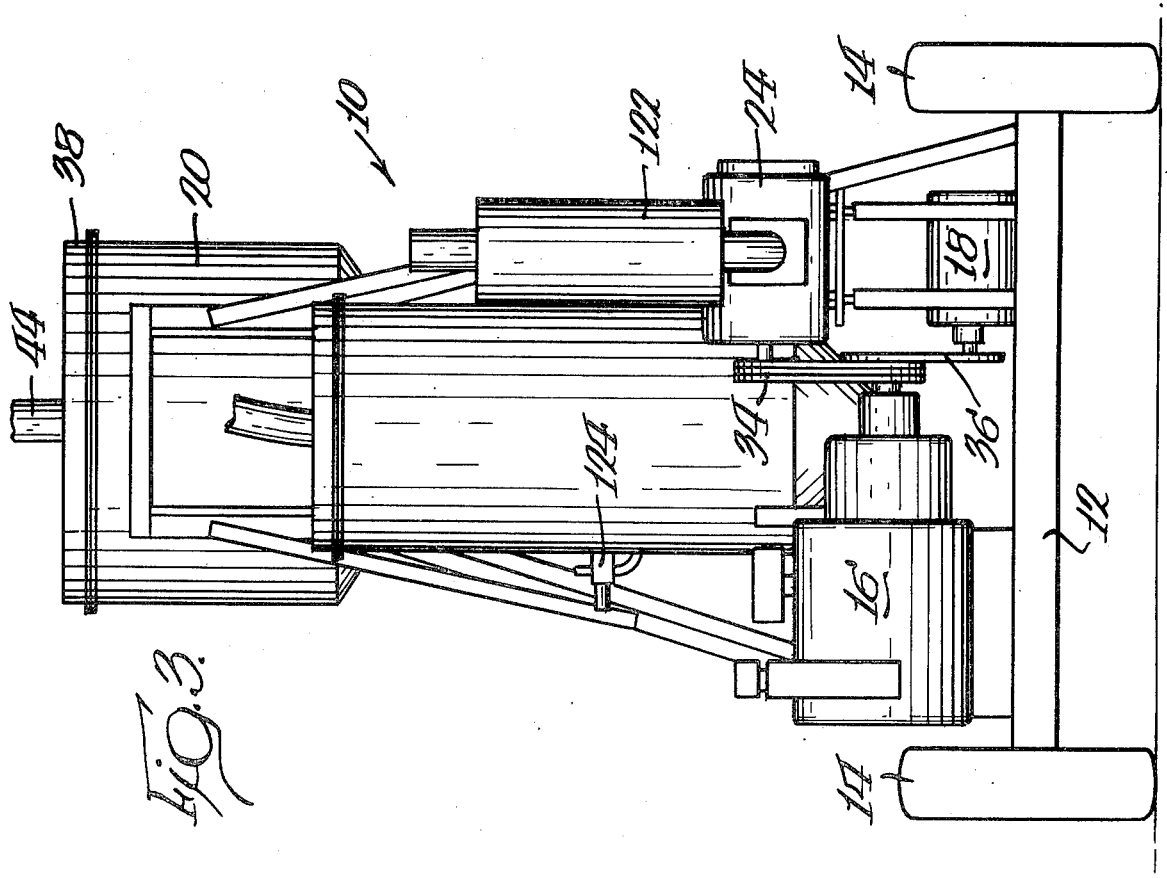

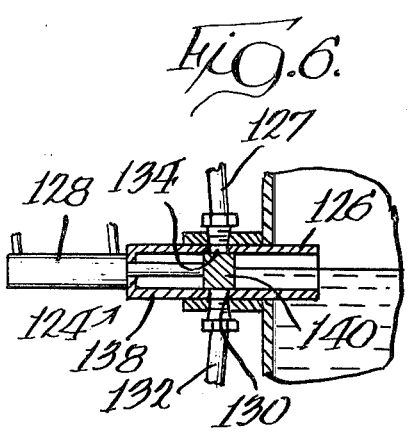
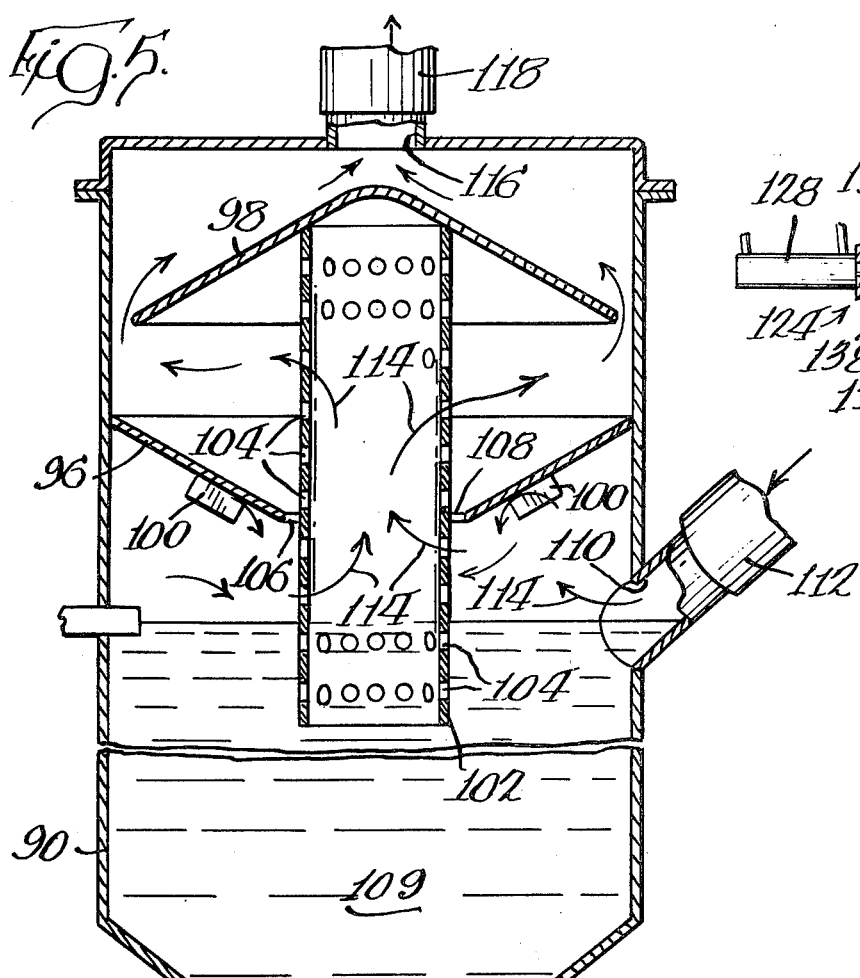
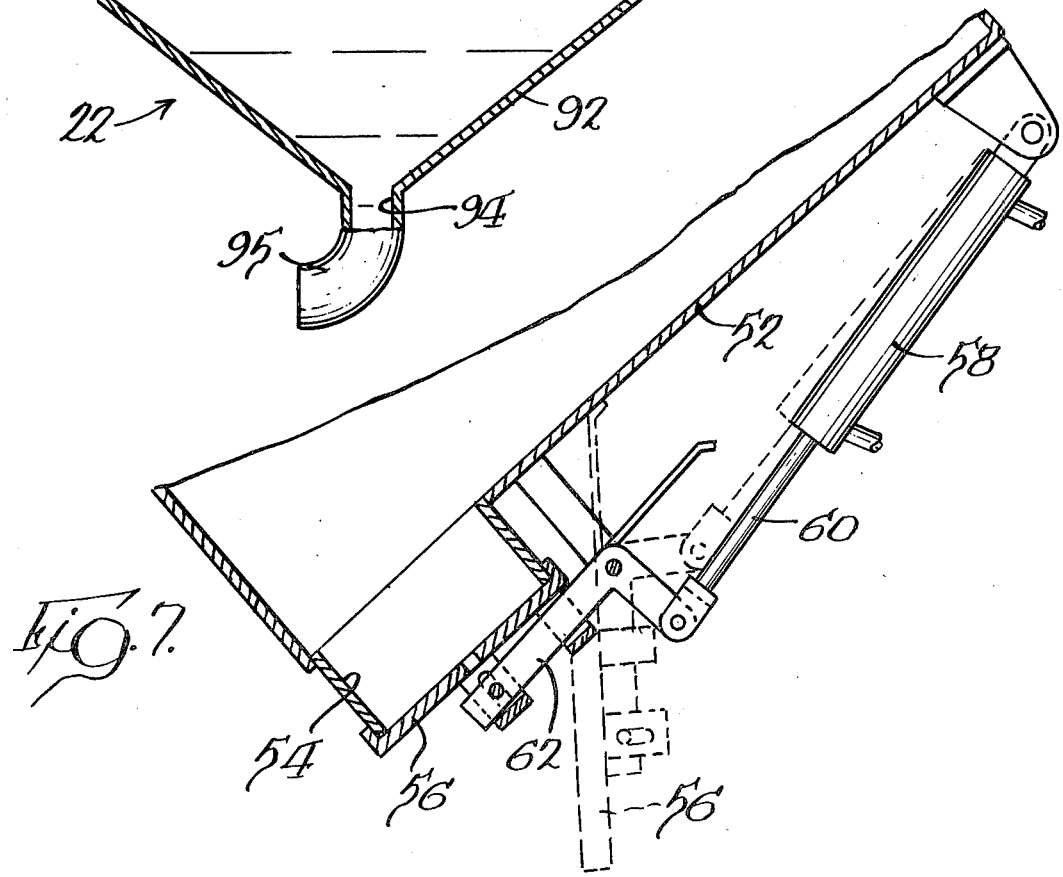

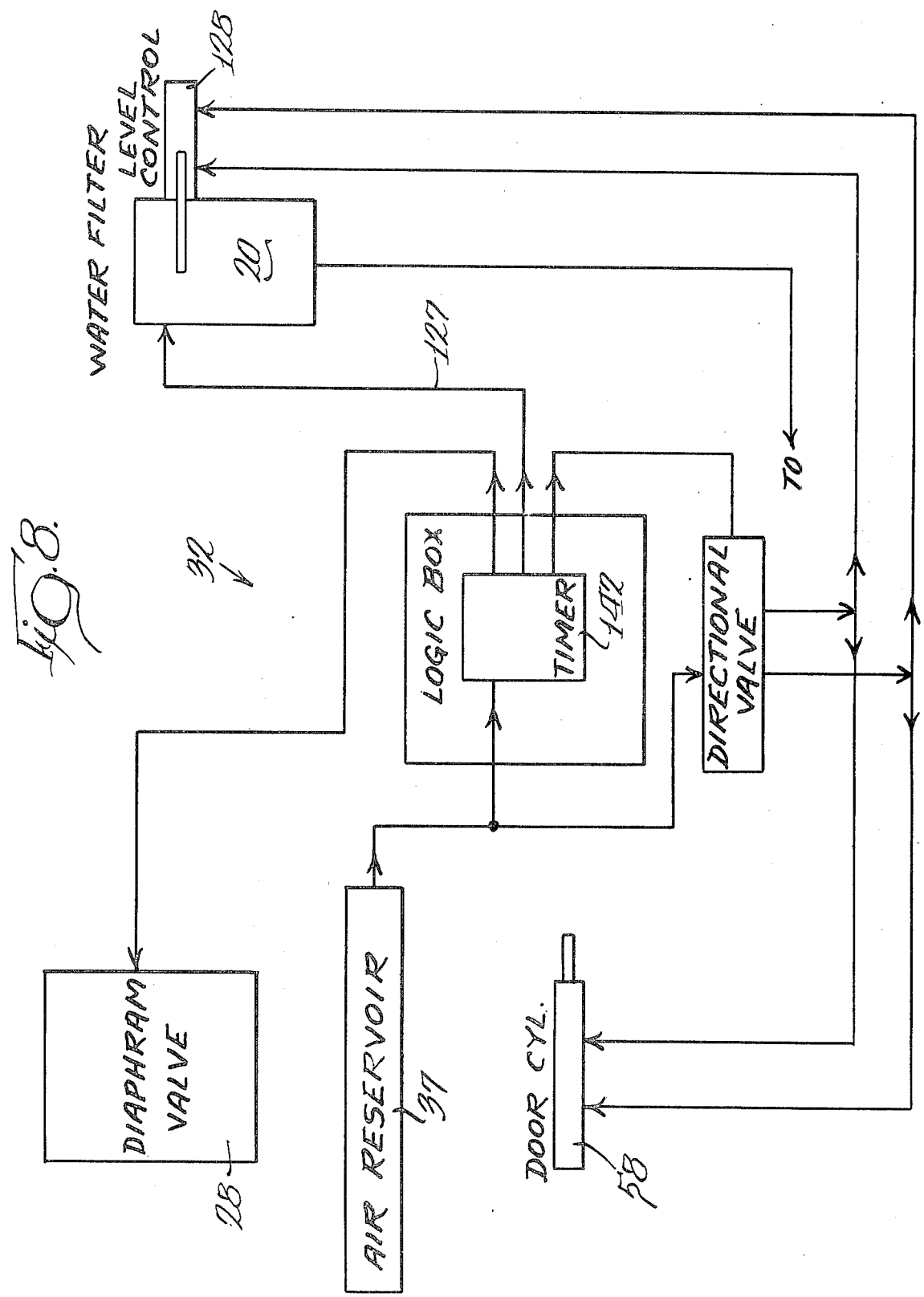

ial vacuum cleaning apparatus 10. The apparatus 10 may be mounted on a trailer-like chassis or frame 12 which in turn is supported on a wheel and axle arrangement 14 by appropriate means. The apparatus 10

VACUUM CLEANING APPARATUS

BACKGROUND OF THE INVENTION

This invention relates to an industrial vacuum cleaning apparatus and particularly to such an apparatus which is adapted to remove gravel and dirt from roofs while the unit remains on the ground level.

SUMMARY OF THE INVENTION

It is an object of the present invention to provide a portable industrial vacuum cleaning apparatus particularly adapted for cleaning gravel and dirt from roofs but movable from place to place at ground level during the vacuuming operation.

Another object of this invention is to provide a vacuum cleaning apparatus including an air control system whereby various functions of the apparatus are accomplished in a programmed sequence.

Another object is to provide vacuum cleaning apparatus means for providing a continuous vacuuming while at the same time providing means for periodic dumping of the contents while the vacuuming operation continues.

A still further object of the invention is to provide in connection with a vacuum cleaning apparatus water filter means for cleaning the air which is eventually exhausted to the atmosphere to thereby minimize air pollution.

By way of summary, the vacuum cleaning apparatus disclosed herein provides means for continuously performing a vacuum cleaning operation including means for accomplishing periodic dumping of the gravel and dirt picked up during the process, a filtering of the contaminated air before exhausting it to the atmosphere and a programmed air control system for controlling the operation of the apparatus.

Other objects and advantage of the invention will become more apparent when considering the following description and accompanying drawings.

BRIEF DESCRIPTION OF THE DRAWINGS

FIG. 3 is a front view in elevation of the vacuum cleaning apparatus of FIG. 1;

FIG. 4 is a rear view in elevation of the apparatus of FIG. 1;

FIG. 5 is a cross-sectional view in elevation of a water filter unit forming part of the vacuum cleaning apparatus;

FIG. 6 is a cross-sectional side view in elevation of a water level unit attached to the water filter unit in FIG. 5;

FIG. 7 is a partial view in section of the trap door opening and closing mechanism associated with the lower compartment;

FIG. 8 is a diagrammatic view of the air logic system which controls the operation of various elements of the vacuum cleaning apparatus.

DESCRIPTION OF A PREFERRED EMBODIMENT

Figure 1:
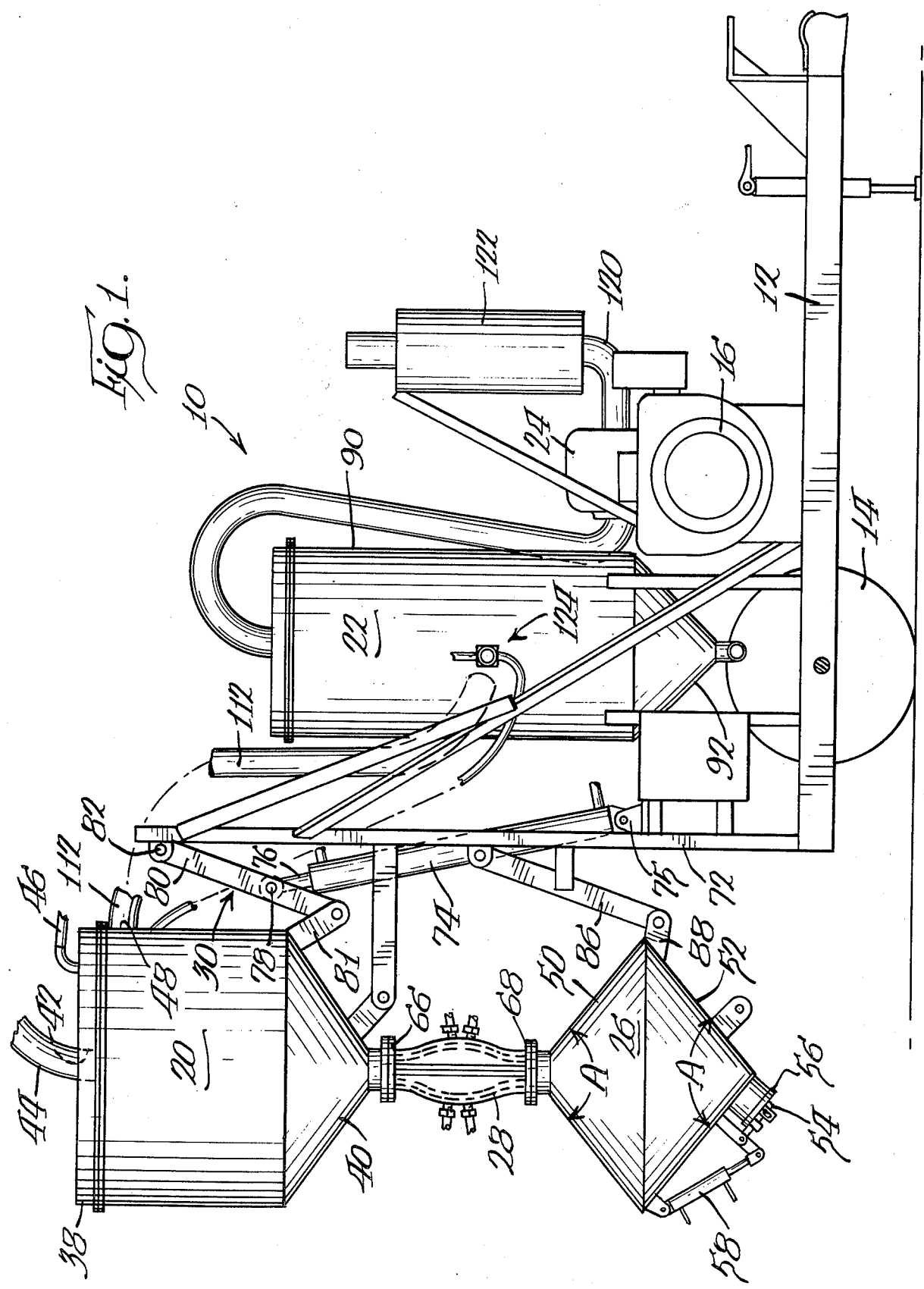
FIG. 1 is a side view in elevation of the vacuum cleaning apparatus embodying the invention herein showing the apparatus in its lowered and transport position.

Referring now to the drawings wherein like reference characters refer to similar parts there is shown in FIG. 1 an industrial vacuum cleaning apparatus 10. The apparatus 10 may be mounted on a trailer-like chassis or frame 12 which in turn is supported on a wheel and axle arrangement 14 by appropriate means. The apparatus 10 is particularly adapted for removing gravel and the like from building roof tops while the apparatus itself is kept at ground level and is conveniently moved from one site to another. The apparatus is designed so that it may be backed over roll-off containers or dump trucks.

The apparatus 10 comprises an engine 16 preferably air cooled, a compressor 18, a first upper vacuum container 20 into which gravel and other dirt is initially sucked, a water filter unit 22, an air pump 24, a second lower dump container 26, a valve 28 interconnecting the first and second containers, a linkage mechanism 30 for hoisting and lowering the first and second containers and the valve interconnecting them, an air control system 32 for controlling various functions of the apparatus.

The engine 16, which preferably is air cooled, drives the air pump 24 through a belt drive 34 and also drives the compressor 18 through a belt drive 36. The compressor supplies air to an air reservoir 37 which in turn is the source of air for the air logic system.

The upper vacuum container 20 may be of a generally cylindrical metal construction with a top cover member 38 removably secured to the container by suitable means and a generally truncated bottom portion 40 to which the valve 28 is attached. An opening 42 is formed in the top cover member to which a flexible vacuum hose or line 44 is attached, the inlet end (not shown) of the latter being moved to the area to be vacuumed. Also, formed at or near the top of the upper vacuum container 20 is a hose line connection to which a water hose 46 is attached to inject water into the upper container 20. An opening 48 also is formed in the container side to which a flexible conduit or hose is attached for conducting air and dust to the water filter unit 22. The water injected into the upper container via hose 46 mixes with the dry gravel dust sucked from a roof being cleaned to form a heavy silt which ultimately is deposited into the lower dump container. It prevents the greater part of the dust from entering the water filter unit 22. The container 20 being of the cyclone type permits a swirling action of the injected water to occur. This helps to prevent a build-up of residue such as tar on the inside of the container 20.

The lower dump container 26 comprises a pair of conical portions 50 and 52 attached base to base. These portions may be formed with an included angle A of approximately 100°. The upper portion 50 is connected to the outlet from the valve 28. The lower portion 52 has formed at the lower end thereof a dumping opening 54 which is closed by a pneumatically operated trap door 56. The conical shapes are particularly advantageous to prevent the accumulation of contaminants on the container wall and effecting easy flow of contaminants to the outlet. An air cylinder 58 is connected through piston rod to the trap door 56 by suitable linkage 62. The air cylinder is operated by the air control system 32 as hereinafter described in more detail.

The valve 28 is a diaphragm valve and is commonly referred to as a "red valve." This particular valve is constructed with a collapsible rubber sleeve 64 disposed within the valve body and having its two ends connected at the two ends of the valve, i.e., at the inlet and outlet ends 66 and 68 of the valve 28. When air pressure is applied on the outside of the rubber sleeve 64 through the air logic system, it is collapsed, thus closing the valve 28. When vacuum is applied to the outside of the rubber sleeve, it is expended and the valve is opened permitting gravel and debris to pass from the upper container 20 into the lower container 26.

Figure 2:
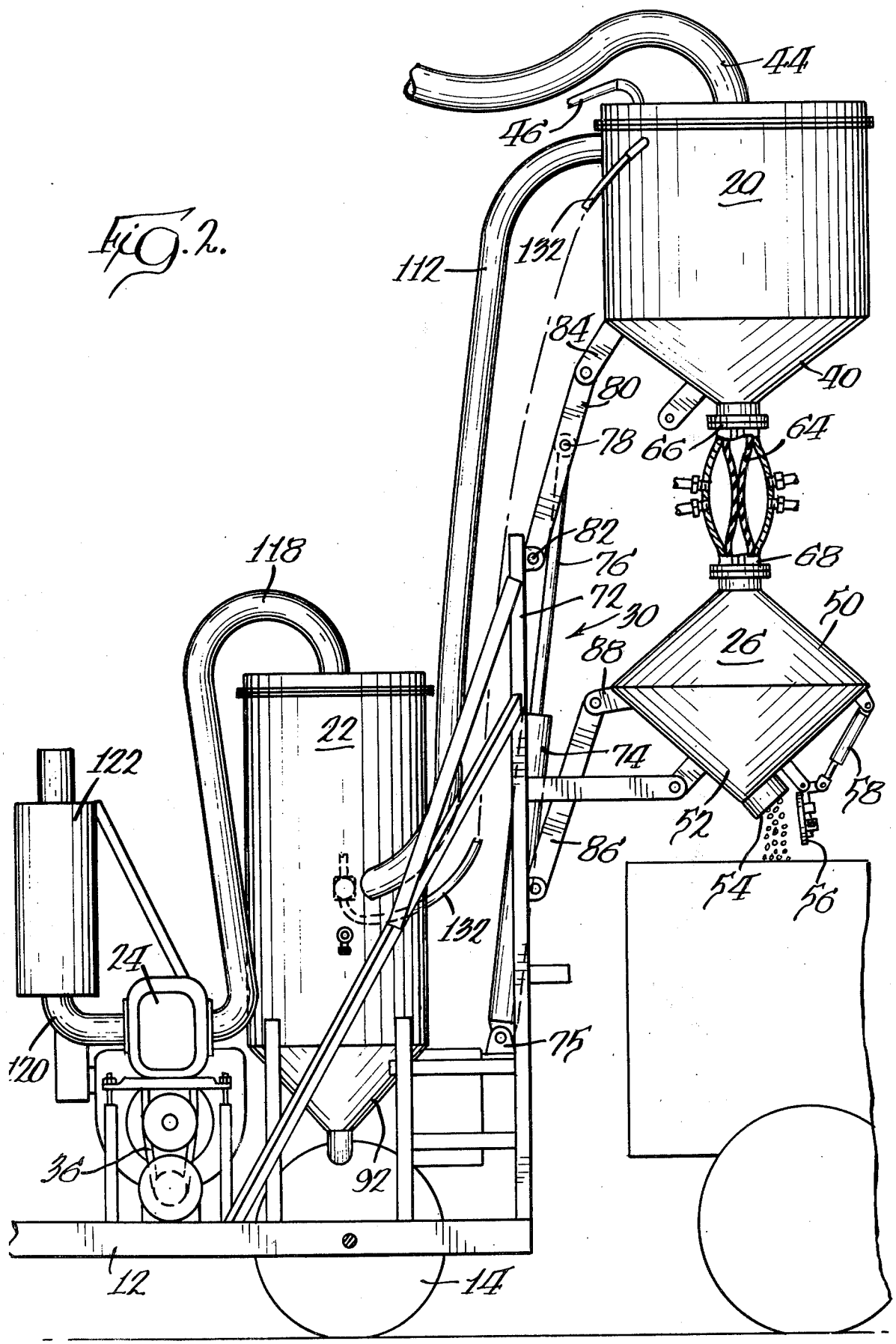
FIG. 2 is a side view in elevation of the vacuum cleaning apparatus taken from the other side and showing the apparatus in its raised operating position.

The upper and lower containers 20 and 26 and the connecting valve 28 are maintained in vertical array whereby gravity is effective to transfer the contaminants from the upper to the lower container and to provide easy release of the contaminants from the lower container. The containers 20 and 26 and valve 28 are supported on the chassis 12 in an adjustable manner cantilevered by means of the linkage mechanism 30 which is pivotally attached to a supporting structure 72 mounted on the chassis 112. The linkage mechanism 30 comprises an air cylinder 74 having its lower end pivotally attached at 75 to the supporting structure 72 and having its piston rod 76 extending therefrom pivotally attached at 78 to an elongated link member 80, the latter being pivotally attached at 82 to the upper portion of the supporting structure 72 and to the arm 84, the latter being secured to the upper container 20. An elongated link member 86 has one end pivotally connected to the supporting structure 72 and the other end pivotally connected to an arm 88 fixed to the lower container 26. In FIG. 1 the upper and lower containers are shown in their lowered or transporting position, and in FIG. 2 they are shown in their elevated operating position.

The water filter unit 22 may be an elongated unit comprising a generally cylindrical casing 90 which is vertically mounted. It has a truncated portion 92 formed at its lower end formed with an opening 94 to which a hose 95 may be attached for dumping. It is intended that the filter unit 22 be maintained filled with water to a desired level, as, for example, indicated in FIG. 5. A pair of baffles 96 and 98 are disposed in the upper portion of the filter unit. The lower baffle 96 is of substantially V-shaped cross-section and is attached at its outer edge to the inner cylindrical surface of the casing 90 by suitable means such as by welding. A plurality of equally circumferentially spaced deflector plates 100, preferably six or eight in number, are attached to the underside of lower baffle 96. The upper baffle 98 is also of a substantially V-shape cross-section but is inverted taking a form somewhat like a coolie cap.

A perforated pipe 102 roughly one-fourth the diameter of the outer casing 90 of the filter unit is positioned at the center of the unit and extends through the lower baffle 96 and up against the lower surface of the upper baffle for which it may provide a support. The pipe 102 has perforations formed therein throughout substantially its full length. The lower end of pipe 102 would normally extend below the water level when the unit is filled to its normal level.

The central opening 106 in the lower baffle is radially spaced from pipe 102 to provide a circumferentially extending space 108 between the pipe and the baffle permitting water to drip back into the water reservoir 109.

An air inlet opening 110 is formed in the side of the casing 90 to receive the air inlet hose 112, which is connected at its other end to the upper end of upper container 20. When dust laden air passes from the upper container 20 to the water filter unit, it hits the water in the unit forming an air water mist. The air inlet 110 is disposed partially below the normal water level in the water filter unit. By this positioning a high amount of turbulence will be created when air enters the filter unit thus breaking up the water molecules and forming an air water mist. This incoming air follows generally the path indicated by the arrows 114 in the water filter unit, passing through the perforations in the pipe 102 up through the center of the pipe, out through the upper perforations in the pipe and around the outer edge of the upper baffle 98 and then through the opening 116 at the top of the filter unit. This air which now is filtered is drawn from the filter unit by the air pump 24 via conduit 118 and exhausted to the atmosphere through conduit 120 and the muffler 122.

An automatic water level unit 124 is attached to the side of the water filter unit 22 at a desired level. It comprises a valve body 126 which may be constructed of square tubing of approximately a 4 inch square cross-section. The valve body extends horizontally into the water filter unit to communicate with the water level therein. A double acting cylinder unit 128 is connected into the outer end of the valve body. A port or opening 130 is formed in the lower portion of the valve body to which is connected an overflow hose 132 which leads to the top of the cyclone or upper container 20 to carry overflow water to the upper container. Another port or opening 134 is provided in the upper side of the valve body 126 to receive an air hose 127 which is connected to a regulator of the air logic system. When the (red) diaphragm valve is opened the cylinder unit 128 operates to shut off the overflow conduit 132 and the expelled air from the red valve is used to push the water into the upper container through a hose, to be expelled into a roll off container along with the gravel.

The double acting cylinder unit 128 includes a piston rod 138 and piston 140, the latter being movable to control the opening of ports 130 and 134.

The purpose of the air control or air logic system 32, of course, is to keep a constant vacuum on the roof to be cleaned, to periodically dump the container contents and to maintain a predetermined water level in the water filter unit and it is shown schematically in FIG. 8. The air control system is programmed to sequentially perform the operations previously described herein and includes a timer mechanism 142 to periodically perform the required functions.

While the apparatus herein described shows the use of a pneumatic system for opening and closing valves and operating cylinders, it is contemplated that a hydraulic system could also be used to perform at least some and perhaps all of the functions described.

The operation of the vacuum cleaning apparatus may be summarized as follows. The engine 16 drives the air pump 24 to create a suction and also drives the small air compressor 18 for operation of the air control or air logic system. After starting the engine 16, a clutch (not shown) is actuated to engage the air pump and the compressor. When the compressor causes the air pressure to rise in a storage tank (not shown) to the appropriate working level, a valve is opened which permits actuation of the air cylinder 74 which controls the up and down movement of the upper and lower containers 20 and 26.

When the apparatus is in position to perform the desired vacuuming operation, the air control or air logic system is activated. By means of the hose 44 placed on the roof, gravel is sucked through the hose into upper container 20 in which it is mixed with water coming from the hose 46, thus watering down a large part of the material removed from the roof. The red valve or diaphragm valve 28 periodically opens and closes in a timed response in accordance with the programming of the air logic system with which it is connected. When it opens, it permits contents from the top container 20 to move through it by gravity into the lower container 20. The trap door 56 on the lower container is intermittently opened and closed by the action of the air cylinder 58, the operation of which also is controlled by the air logic system. The opening and closing of the diaphragm valve 28 and the trap door 56 are controlled to have one open when the other is closed and vice versa. Thus no vacuum is lost from upper container 20 and the suction on the roof, therefore, is continuous. The contents entering the upper container 20 mixed with water fall through the diaphragm valve 28 into lower container 26 whose door is closed. At adjustable intervals, which could be anywhere between 15 seconds to 10 minutes, the bottom door 56 opens, allowing the contents to fall out, the red valve remaining closed during that time trapping the contents in the upper container 20.

The air sucked into the upper container separates from the gravel in the upper container and is sucked into the water filter via conduit 112 where much of the dust and other pollutants are removed. The air entering the water filter strikes the water at an angle pointing down into the water thereby causing a water spray or mist which cleans the air. The air and water mixture passes through the lower perforations in the pipe 102, passes upward into the pipe, then out again through upper perforations in the pipe and around the edge of the upper baffle through outlet 116 in the top of the water filter and via conduit 118, air pump 24 and conduit 120 to the atmosphere.

Because of the baffles, a substantial turbulence is created which results in a fine air spray. The velocity of the spray slows down in the center of the pipe 102 so that the air in the center of the pipe no longer has sufficient velocity to carry the weight of the water beads and particles, thereby allowing water and particles to fall by gravity downward from the center of the pipe into the water basin. The mist outward from the pipe's center will flow out through the pipes perforations and up around the coolie cap. The coolie cap substantially reduces the velocity of the mist so that water bubbles condense and drip along the exterior of the pipe along with particles. Since there is space 108 separating the lower baffle 96 from the central pipe, the water bubbles and particles may fall into the basin. When the red valve is cooled, excess water will accummulate in the water level unit.

It is believed that the apparatus described herein will function properly in virtually any weather in which roofing work is normally carried out. However, if it were desired to utilize the apparatus of the present invention in extremely cold weather, it might be desirable to substitute an air filter unit for the water filter unit described herein in order to avoid the possibility of a problem caused by freezing of the latter.

While a preferred embodiment of the invention has been disclosed, it will be appreciated that this has been shown by way of example only, and the invention is not to be limited thereto as other variations will be apparent to those skilled in the art and the invention is to be given its fullest possible interpretation within the terms of the following claims.

What is claimed is:

1. An industrial vacuum cleaning apparatus for removing gravel and the like from a roof comprising: upper container means having an inlet into which particulate materials may be sucked; lower container means, communicating through a passageway with said upper container means, into which contaminants may be dumped from the upper container means; air pump means for creating a suction in said upper container means; pneumatically operated valve means positioned in said passageway between the upper and lower container means for controlling the release of contaminants from the upper container means to the lower container means; pneumatically operated valve means connected to the lower container means for releasing collected particulate material therefrom; and pneumatic control means for alternatively and intermittently opening the first valve means when the second valve means is closed, and for opening the second valve means when the first valve means is closed, to prevent a significant amount of backflow through the valves into the first container when the air pump means is operating; an air suction line leading from said upper container to a water filter unit through which contaminated air from the upper container means may be purified before being exhausted to the atmosphere; water hose means leading to said upper container and said water filter means to permit the flow of water from said water filter means to said upper container to wet solids therein; and water level maintaining means in said water filter means for removing water from the container, to maintain said predetermined water level.

2. The apparatus of claim 1 wherein
said valve means is a diaphragm valve including a rubber sleeve connected to the inlet and outlet ends of said valve and adapted to be collapsed for closing said valve.

3. The apparatus of claim 1 wherein
said means for releasing contaminants from said lower container means includes an opening in the bottom of said lower container means, a trap door normally closing said opening and a piston cylinder arrangement connected to said trap door for operating the latter between and open and closed position.

4. The apparatus of claim 1 including
frame means on which the apparatus is mounted; and
means for moving said upper and lower container means from a transporting position to an operating position and vice versa,
said moving means including linkage means connected to said frame means and a piston and cylinder arrangement connected to said frame means and to said linkage means.

5. The apparatus of claim 4 including
a water level unit attached to said water filter device for controlling the water level in said water filter device and including overflow means for carrying excess water to said upper container means.

6. The apparatus of claim 1 in which said water filter means comprises a chamber, said air suction line passing through said chamber wall to introduce exhaust air into said cylindrical chamber, said container being filled to a predetermined level with water, whereby air entering said container through said outlet line impinges the surface of said water.

7. The apparatus of claim 6 in which said air filter means comprises a perforated cylindrical member positioned generally coaxially within said chamber, and a baffle member surrounding said cylindrical member to occlude most of the space of said container between the cylindrical member and the inner wall thereof of the chamber, said baffle being positioned above the predetermined water level and carrying, on its side facing the water level a plurality of radially extending deflector plates.

8. The apparatus of claim 7 in which a second baffle is positioned at the upper end of said perforated cylindrical member to occlude the end, said second baffle being of generally circular cross section, and positioned with a raised central portion and peripheral portions which extend downwardly about said perforated cylindrical member.

9. The apparatus of claim 8 in which said first baffle member defines aperture means at a radially inward portion thereof adjacent the perforated cylindrical member.

* * * * *